Figure 1:
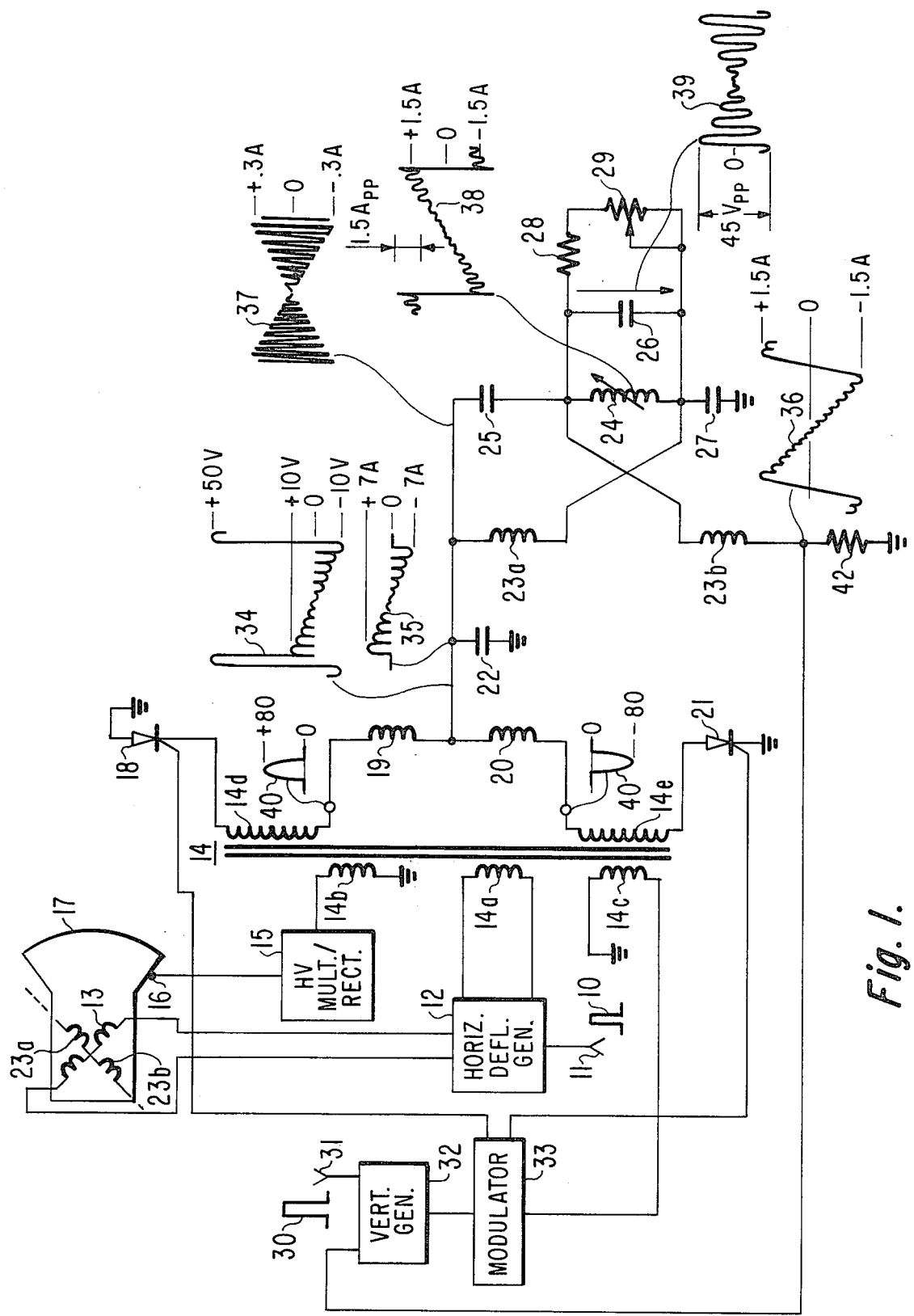

United States Patent [19]

Haferl

[11] 4,041,354
[45] Aug. 9, 1977

[54] PINCUSHION CORRECTION CIRCUIT

[75] Inventor: Peter Eduard Haferl, Zurich, Switzerland

[73] Assignee: RCA Corporation, New York, N.Y.

[21] Appl. No.: 618,842

[22] Filed: Oct. 2, 1975

[51] Int. Cl.² .................... H01J 29/70; H01J 29/76
[52] U.S. Cl. ................................. 315/371; 315/408
[58] Field of Search ................... 315/370, 371, 408

[56] References Cited

U.S. PATENT DOCUMENTS

| 3,444,423 | 5/1969 | Marshall | 315/371 |
| 3,648,099 | 3/1972 | Otten et al. | 315/371 |
| 3,916,254 | 10/1975 | Worster et al. | 315/370 |

Primary Examiner—Maynard R. Wilbur
Assistant Examiner—T. M. Blum
Attorney, Agent, or Firm—Eugene M. Whitacre; Paul J. Rasmussen

[57] ABSTRACT

In a vertical deflection circuit in which a capacitor in parallel with a pair of vertical deflection coils is charged by respective decreasing and increasing amounts of horizontal rate energy during respective first and second portions of a vertical scan interval for providing a substantially linear vertical sawtooth current through the vertical coils, a resonant circuit tuned to approximately the horizontal rate is coupled in parallel with the capacitor and a portion thereof is serially coupled with the vertical coils for providing a horizontal rate current component of such a phase in the vertical coils as to correct for top and bottom pincushion distortion.

6 Claims, 8 Drawing Figures

HOR. RETRACE

$V_{L24}$
$I_{CORR.}$

Fig. 2g.

PINCUSHION CORRECTION CIRCUIT

BACKGROUND OF THE INVENTION

This invention relates to a pincushion distortion correction circuit suitable for use in a television receiver.

It is known in the art that top and bottom pincushion distortion of the raster on a television picture tube may be substantially eliminated by modulating the vertical rate scanning current through the deflection coils by a substantially parabolic current component at the horizontal scanning rate. Generally the desired modulation has been achieved by active circuits in which a transistor stage amplifies horizontal rate energy and has its output electrodes coupled to the vertical scanning circuit, or, by passive circuits in which a control or primary winding of a reactor or transformer is energized by horizontal rate energy and a secondary winding is placed in circuit with the vertical deflection winding. Provision must also be made to ensure that the polarity of the horizontal rate modulation reverses at the center of the vertical scanning interval and that the modulation is greatest at the beginning and end of the vertical interval and minimum at the center. Usually the circuit elements and their required interconnections result in a relatively complex and costly arrangement.

Summary of the Invention

A pincushion correction circuit includes a capacitor coupled in parallel with a vertical deflection winding. Means coupled to the first capacitor charge the capacitor with respective decreasing and increasing amounts of horizontal rate energy during respective first and second scan portions of each vertical deflection interval for providing a substantially linear vertical rate sawtooth current in the winding. A resonant circuit tuned to approximately the horizontal rate is coupled to said means, for receiving the decreasing and increasing amounts of horizontal rate energy and a portion of the resonant circuit is serially coupled with the vertical winding for providing a generally parabolic horizontal rate current component in the winding of such a phase as to reduce top and bottom pincushion distortion.

A more detailed description of the invention is given in the following description and accompanying drawings in which:

FIG. 1 is a block and schematic circuit diagram of a portion of a television receiver embodying a pincushion correction circuit according to the invention; and FIGS. 2a-2g are curves illustrating various current and voltage waveforms obtained in the circuit of FIG. 1.

DESCRIPTION OF THE INVENTION

In FIG. 1, with the exception of the pincushion correction circuit portion to be described subsequently, the remainder of the figure shows a switched vertical deflection system similar to that disclosed in copending U.S. application Ser. No. 595,809 filed July 14, 1975 for Peter E. Haferl and entitled "SWITCHED VERTICAL DEFLECTION SYSTEM." Horizontal rate sync pulses 10 are coupled to an input terminal 11 of a horizontal deflection generator 12 for producing a sawtooth scanning current in horizontal deflection coils 13 disposed around a kinescope 17 and for producing horizontal rate energy including retrace pulses in a primary winding 14a of a horizontal output and high voltage transformer 14. A tertiary winding 14b is coupled to a high voltage multiplier and rectifier assembly 15 for producing a relatively high d.c. voltage which is coupled to an ultor terminal 16 of kinescope 17.

Windings 14d and 14e are serially coupled in circuit with an SCR 18, an inductor 19, an inductor 20 and SCR 21, the anode of SCR 18 and the cathode of SCR 21 being grounded. The junction of inductors 19 and 20 is coupled to a capacitor 22 which in turn is coupled in parallel with vertical deflection windings 23a and 23b and inductor 24. The bottom of winding 23b is coupled through a feedback resistor 41 to ground.

A feedback signal developed across resistor 42 is coupled to a vertical generator 32 which has vertical sync pulses 30 coupled to an input terminal 31. Vertical generator 32 comprises an oscillator and sawtooth generator for developing suitably shaped vertical rate voltage sawtooth waveforms which are coupled to a modulator 33. The winding 14c of transformer 14 provides horizontal rate retrace pulses to modulator 33 for producing horizontal rate pulses, pulse width modulated at the vertical rate, which pulses are coupled to the gate electrodes of respective SCR's 18 and 21, to initiate the conduction thereof in a proper timing sequence. As taught in the aforementioned copending application, the gate pulses coupled to SCR 18 occur with increasing delay relative to the leading edge of the horizontal retrace pulses during a first portion of each vertical interval and the pulses coupled to SCR 21 occur with decreasing delay relative to the leading edge of the horizontal retrace pulses during a second portion of each vertical deflection interval.

Referring to FIGS. 2a, 2b and 2c which illustrate in more detail the more generalized waveforms bearing the same numbers in FIG. 1, operation of the switched vertical circuit can be more easily understood. At the beginning of each vertical trace interval following $T_1$, SCR 18 is gated on and conducts a current 35 which charges capacitor 22 through a series resonant circuit comprising inductor 19 and capacitor 22. Winding 14d acts as a voltage source which provides horizontal retrace pulses 40 of approximately an 80 volt amplitude and poled as indicated in FIG. 1 for causing the current 35 to flow through SCR 18 and the resonant circuit. This current flow produces a generally sawtooth voltage waveform 34 across capacitor 22 during the vertical trace interval. During the first portion of the vertical trace interval, $T_1$ - $T_2$, SCR 18 is gated such that decreasing amounts of horizontal rate energy is stored in capacitor 22. During the latter half of each vertical deflector interval $T_2$ - $T_3$, SCR 21 is gated on for increasing periods of time of each horizontal retrace period and causes an opposite polarity current of increasing amplitude to flow into capacitor 22 as illustrated by waveform 35 of FIG. 2c.

It is noted that during the crossover portion at $T_2$ at both SCR 18 and 21 may conduct, the difference between their currents charging capacitor 22 and the remaining current flowing in a quiescent current path comprising SCR 18, winding 14d, inductor 19, inductor 20, winding 14e and SCR 21. Inductor 20 and capacitor 22 form a resonant charging circuit for capacitor 22 from pulses 40 developed across winding 14e during the interval when SCR 21 is conducting.

The discharging path for capacitor 22 is through vertical deflection coils 23a, 23b, inductor 24 and feedback resistor 42 to ground. The vertical deflection winding 23a and 23b provide a relatively high impedance to the horizontal rate energy resulting in the voltage waveform 34 of FIG. 2b, representing the voltage across capacitor 22, being integrated for producing a generally linear sawtooth current waveform 36 of FIG. 2d through deflection windings 23a and 23b.

It is noted that the integration of voltage waveform 34 by deflection windings 23a and 23b causes the vertical rate deflection current 36 of FIG. 2d to contain a generally parabolic component at the horizontal deflection rate. Thus, the switched vertical circuit inherently provides some degree of top and bottom pincushion distortion correction. However, depending upon such factors as the vertical deflection winding impedance and the amplitude of the vertical scanning current the parabolic component of the vertical scanning current may not have the proper phase or amplitude for satisfactorily providing top and bottom pincushion correction. By inspection of voltage waveform 34 of FIG. 2b it can be seen that the voltage is not an ideal sawtooth waveform, the rising edge portion being curved rather than straight. The integration of waveform 34 by windings 23a and 23b produces a parabolic current which is retarded in phase such that complete pincushion correction for 110 degree deflection angle picture tubes may in some cases not be obtainable.

The pincushion correction circuit includes the series connection of capacitors 25 and 27 in series with the parallel resonant circuit made up of inductor 24 and capacitor 26. Capacitor 25 is coupled to capacitor 22 to receive drive current therefrom and the bottom of capacitor 27 is grounded. Resistor 28 and potentiometer 29 are coupled in parallel with inductor 24 and capacitor 26 and serve to damp the oscillations thereby providing an amplitude control for the pincushion correction current.

The drive current for the pincushion circuit is illustrated by current waveform 37 which is the current through capacitor 25 and the rest of the pincushion circuit to ground. It is noted that this bowtie shape horizontal rate current modulated at the vertical rate is obtained directly from the junction of capacitor 22 and inductors 19 and 20 in the switched vertical circuit. The current of waveform 37 is in phase with the current waveform 35 which is the charging current for capacitor 22. With reference to the expanded portion of current waveform 37 illustrated in FIG. 2e, the sharply rising positive portion just following $T_1$ is caused by the rapid increase in charge current 35 of capacitor 22. The following flat portion of current waveform 37 represents the time of the decreasing current waveform portion in waveform 35 and the increasing voltage portion of voltage waveform 34. During this period, SCR 18 is conducting providing a low source impedance for the pincushion correction circuit. At the end of this portion of waveform 37, the current changes into a sinewave shape because capacitor 22 is now in series with the pincushion circuit comprising capacitor 25, inductor 24, capacitor 26 and capacitor 27, all of which form a series resonant circuit. This series circuit exists during the time that both SCR 18 and SCR 21 are nonconducting.

The drive current of waveform 37 produces a resonant current illustrated by waveform 38 of FIG. 2f in the parallel resonant circuit comprising inductor 24 and capacitor 26. The resonant frequency of this circuit is determined by inductor 24 and capacitor 26 in parallel with the capacitors 25 and 27 through capacitor 22 to ground. In determining the resonant frequency, capacitor 22 and the inductance vertical windings 23a and 23b can be ignored because of their relatively large values compared to the rest of the pincushion circuit reactive elements. The current illustrated by waveform 38 is out-of-phase by 180° with the current through windings 23a and 23b as illustrated by current waveform 36 of FIG. 2d because of the interconnection of inductor 24 relative to the vertical windings 23a and 23b as illustrated in FIG. 1.

The ringing voltage across the parallel resonant circuit is illustrated by the voltage waveform 39 of FIG. 2g. Voltage waveform 39 represents the pincushion correction current source which causes a correction current illustrated by waveform 41 of FIG. 2g to flow from the center terminals of the deflection windings 23a and 23b to the outer terminals. This correction current waveform 41 lags the ringing voltage waveform 39 by approximately 90° because of the relatively high inductance of deflection windings 23a and 23b. The phase of the correction current waveform 41 is determined by the setting of phase control inductor 24 which can be set to advance the phase of the driving voltage waveform 39 of FIG. 2g to compensate for the retarded phase parabolic current waveform discussed above and is such that it adds to the parabolic current component illustrated by waveform 36 of FIG. 2d. This enhances the parabolic component at the horizontal rate approximately half way between successive horizontal retrace pulses 40 of FIG. 2a which is the proper phase for producing pincushion distortion correction.

Adjustment of inductor 24 varies the resonant frequency of the pincushion circuit above or below the horizontal rate frequency which varies the phase of the correction current so that it may be properly adjusted to produce the pincushion correction desired with a given combination of peak vertical deflection current and deflection winding parameters.

The described pincushion correction circuit is relatively inexpensive and is highly efficient because it utilizes few components and utilizes directly the vertical modulated horizontal rate waveforms generated by the switched vertical deflection circuit.

The following is a listing of the values of circuit elements providing the pincushion correction for a 110° large screen picture tube such as the RCA Corporation model number A 67-610X.

R28: 56 ohms
R29: 500 ohms
R42: 0.47 ohms
C22: 3 uf
C25,26: 0.22 uf
C26 0.33 uf
L23a,23b: 2.77 ohms, 3.36 mh (series connected)
L24: 0.25 mh

What is claimed is:
1. A pincushion correction circuit comprising:
a first capacitor;
a vertical deflection winding coupled in parallel with said capacitor;
means coupled to said first capacitor for charging said capacitor with respective decreasing and increasing amounts of horizontal rate energy during respective first and second scan portions of each vertical deflection interval, the discharge of which capacitor providing a substantially linear vertical rate sawtooth current in said winding;
a resonant circuit tuned to approximately said horizontal rate coupled to said means, for receiving said decreasing and increasing amounts of horizontal rate energy; and a portion of said resonant circuit serially coupled with said vertical winding for providing a generally parabolic horizontal rate current component in said winding of such a phase as to reduce top and bottom pincushion distortion.

2. A pincushion correction circuit according to claim 1, wherein said portion of said resonant circuit itself comprises a second resonant circuit.

3. A pincushion correction circuit according to claim 2, wherein said second resonant circuit comprises a parallel resonant circuit.

4. A pincushion correction circuit according to claim 2, wherein said second resonant circuit is serially coupled between two portions of said vertical winding.

5. A pincushion correction circuit according to claim 3, wherein damping means are coupled to said second resonant circuit for controlling the amplitude of said parabolic current.

6. A pincushion correction circuit comprising:
a first capacitor;
a vertical deflection winding coupled in parallel with said capacitor;
means coupled to said first capacitor for charging said capacitor with respective decreasing and increasing amounts of horizontal rate energy during respective first and second scan portions of each vertical deflection interval for providing a substantially linear vertical rate sawtooth current in said winding;
a first resonant circuit tuned to approximately said horizontal rate coupled to said means, for receiving said decreasing and increasing amounts of horizontal rate energy; and
a portion of said first resonant circuit comprising a second resonant circuit serially coupled with said vertical winding for providing a generally parabolic horizontal rate current component in said winding of such a phase as to reduce top and bottom pincushion distortion, said first resonant circuit comprising a series arrangement of a second capacitor, said second resonant circuit and a third capacitor, said second capacitor also coupled to said first capacitor and said third capacitor also coupled to a reference potential.

* * * * *